(12) United States Patent
Uri et al.

(10) Patent No.: US 8,005,066 B2
(45) Date of Patent: Aug. 23, 2011

(54) TECHNIQUES FOR PATH FINDING AND TERRAIN ANALYSIS

(76) Inventors: Kareev Uri, Ramat-Hasharon (IL); Amihai Viks, Ramat-Gan (IL); Assaf Mendelson, Tel Aviv (IL); Ramon Axelrod, Holon (IL)

(*) Notice: Subject to any disclaimer, the term of this patent is extended or adjusted under 35 U.S.C. 154(b) by 67 days.

(21) Appl. No.: 12/207,680

(22) Filed: Sep. 10, 2008

(65) Prior Publication Data
US 2009/0013090 A1 Jan. 8, 2009

Related U.S. Application Data

(62) Division of application No. 11/089,029, filed on Mar. 25, 2005, now Pat. No. 7,440,447.

(60) Provisional application No. 60/555,975, filed on Mar. 25, 2004.

(51) Int. Cl.
*H04L 12/28* (2006.01)
(52) U.S. Cl. ......................... 370/351; 370/400
(58) Field of Classification Search .................. 370/241, 370/248, 252, 351
See application file for complete search history.

(56) References Cited

U.S. PATENT DOCUMENTS

| | | | |
|---|---|---|---|
| 5,502,538 A | 3/1996 | Ogasawara | |
| 5,548,773 A | 8/1996 | Kemeny et al. | |
| 5,808,887 A | 9/1998 | Dorst et al. | |
| 5,892,964 A | 4/1999 | Horan et al. | |
| 5,920,172 A | 7/1999 | Bauer | |
| 6,033,441 A | 3/2000 | Herbert | |
| 6,046,564 A | 4/2000 | Kim | |
| 6,295,528 B1 * | 9/2001 | Marcus et al. | 707/759 |
| 6,390,097 B1 | 5/2002 | Chandra | |
| 6,604,005 B1 | 8/2003 | Dorst et al. | |
| 6,728,581 B1 | 4/2004 | Trovato et al. | |
| 2003/0128203 A1 | 7/2003 | Marshall et al. | |
| 2004/0266526 A1 | 12/2004 | Herbrich et al. | |

* cited by examiner

*Primary Examiner* — Brenda Pham
(74) *Attorney, Agent, or Firm* — Sughrue Mion, PLLC

(57) ABSTRACT

A system for path finding and terrain analysis. The system includes at least one processing unit, a graph processing unit and an artificial intelligence logic unit. A local bus is coupled to the at least one processing unit, the graph processing unit, the artificial intelligence unit and a bus interface unit. A memory bus is coupled to said bus interface unit, the at least one processing unit, a data memory, and a program memory. The graph processing unit further includes a network of interconnected nodes. Each of said nodes have at least one digitally programmable delay unit.

9 Claims, 8 Drawing Sheets

TECHNIQUES FOR PATH FINDING AND TERRAIN ANALYSIS

Figure 1:
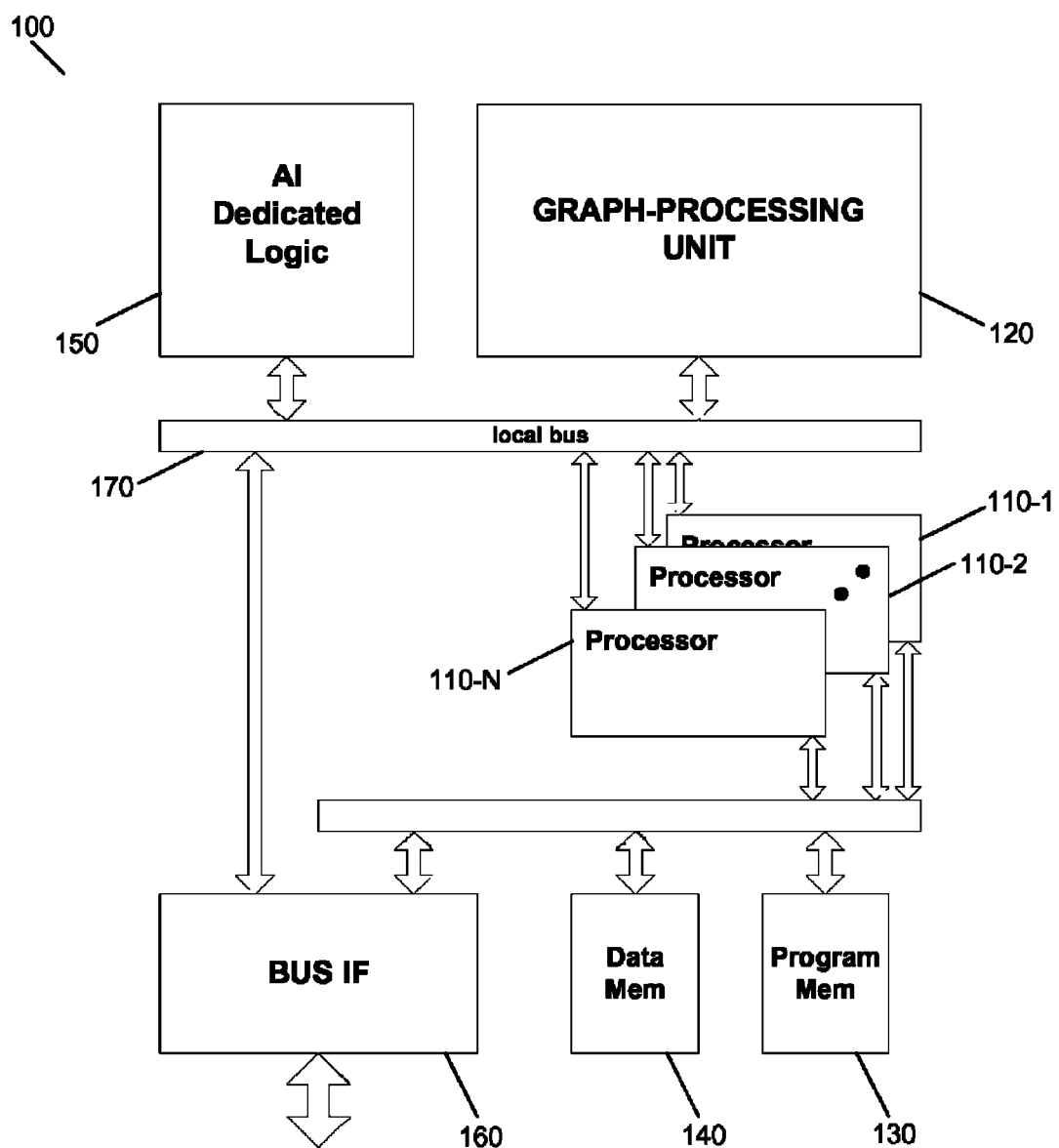

This application is a Divisional Application of U.S. patent application Ser. No. 11/089,029 filed Mar. 25, 2005, now allowed, and that further claims priority from of U.S. provisional patent application Ser. No. 60/555,975 filed on 25 Mar. 2004 both of which Applications are hereby incorporated by reference for all that they contain.

I. DESCRIPTION

I.a. Field

The present disclosure generally teaches techniques related to the field of graph-theory, and more specifically to path finding. The teachings further relate to the field of game artificial intelligence (AI), and more specifically to AI-movement and terrain analysis.

I.b. Background

1. References

The following U.S. patents and papers provide useful background information, for which they are incorporated herein by reference in their entirety.

| A) Patents | | |
|---|---|---|
| 1. 6,728,581 | April 2004 | Trovato et al. |
| 2. 6,390,097 | May 2002 | Chandra |
| 3. 6,604,005 | August 2003 | Dorst et al. |
| 4. 6,046,564 | April 2000 | Kim |
| 5. 5,920,172 | July 1999 | Bauer |
| 6. 5,808,887 | December 1998 | Dorst et al. |
| 7. 5,548,773 | August 1996 | Kemeny et al. |
| 8. 5,502,538 | March 1996 | Takenaka |
| B) Published Patent Applications | | |
| 9. 20040266526 | December 2004 | Herbrich et al. |
| 10. 20030128203 | July 2003 | Marshall et al. |

I.c. Introduction

Path-finding, is a term used for a collection of techniques for finding an optimal route between two points. This can range from trying to find the fastest way between places, to finding the safest road for an automated robot vehicle around obstacles. In computer games, video games, and military simulations, to name a few, the demand is for paths to look "natural"—which typically translates to finding the shortest route and applying some post-processing, such as smoothing and edge rounding.

Computer games, video games and military simulations also include various techniques for terrain analysis aimed at retrieving strategic information from the terrain. All these techniques can be expressed using weighted graphs. These techniques also include finding choke points, finding connected regions, finding all points that are connected to a given point with a cost smaller than a threshold value (also known as a T-connected region) and finding the point with maximal T-connected region.

Such game artificial intelligence (AI) techniques are usually performed on a raster map, which is a grid representation, where movement is allowed only between adjacent cells, or on generalized weighted graph where each node is associated with some information concerning the virtual world, for example a space position or a room. The problem of finding a minimal path on a raster map may also be reduced to searching weighted graphs.

Current methods for path-finding and terrain analysis heavily rely on computer software. Significant theories and associated techniques are known for searching. A solution for path-finding is to simply try all of the paths by using, for example, depth-first-search (DFS) or breadth-first-search (BFS) techniques, and then finding the shortest path. However, these techniques are extremely inefficient. Other techniques were developed which try the more promising paths first, and generally demonstrate faster results.

A variant of the "A*" (A star) technique which is a heuristic technique is used for a lot of the games. It relies on a preprogrammed educated guess of which paths are better. The heuristic approach does not guarantee the shortest path, as once a path is found there is no attempt to continue to find the actually shortest path. Moreover, in complex maps, where the heuristic fails, running time becomes very long. Lastly, even the A* based techniques are implemented in software and consumes a lot of the central processing unit (CPU) resources.

There have been improvements for implementing minimal path searches in dedicated integrated circuits. Minimal path search is the first part of path-finding prior to the post-processing step. These solutions are either too general or targeted at a specific use. For example, U.S. Pat. No. 5,548,773 describes related art regarding path-finding, and suggests the finding of an optimum path by using a digital parallel processor array. The solution proposed in '773 suffers from at least a significant flaw as each query requires the restoring of the whole graph. This is an extremely time consuming task, especially in cases where there may be a demand for thousands of queries for the same graph, such as would be the case, for example, in computer games. Furthermore, U.S. Pat. No. 5,548,773 does not offer any terrain analysis capabilities nor can it be adapted for such tasks.

II. SUMMARY

There is a need for a solution to allow for efficient path-finding and terrain analysis in general, and in particular for computer games where faster path-finding and terrain analysis provide for a better system solution. To overcome some of the problems noted above, the disclosed teachings provide a system for path finding and terrain analysis.

The system includes at least one processing unit, a graph processing unit and an artificial intelligence logic unit. A local bus is coupled to the at least one processing unit, the graph processing unit, the artificial intelligence unit and a bus interface unit. A memory bus is coupled to the bus interface unit, the at least one processing unit, a data memory, and a program memory. The graph processing unit further includes a network of interconnected nodes. Each of the nodes have at least one digitally programmable delay unit.

In another specific enhancement each of the nodes of the graph processing unit further comprise a plurality of input latches. Each of the input latches being coupled to a respective input signal. A plurality of comparators, each of the comparators being coupled to a respective output signal, are provided. A transition detector operable to detect a transition in at least one of the outputs of the plurality of input latches, and further operable to assert a transition indication signal is provided. At least one storage unit operable to store a plurality of edge weights, each of the edge weights corresponding to a respective comparator from the plurality of comparators is provided. At least one counter is coupled to each of the plurality of comparators. More specifically, at least one of the comparators is operable to generate an output signal when a value from the at least one counter is greater than an edge weight corresponding to said at least one comparator.

More specifically, the counter is operable to start counting when the transition indication signal is asserted.

More specifically, the plurality of latches are operable to latch corresponding values and further operable to cease accepting additional values from the input signals when the transition indication signal is asserted. More specifically, the storage unit is operable to be loaded with a plurality of edge weights corresponding to said plurality of comparators.

Even more specifically, the edge weights correspond to a terrain map.

In another specific enhancement, the system is integrated into a monolithic semiconductor device.

In yet another specific enhancement, the interconnection in the network of interconnected nodes includes connections between neighboring nodes and connections between non-neighboring nodes.

In yet another specific enhancement, the system is operable to allow for a delay controlled propagation of a signal from an origin node of the network of interconnected nodes to any one non-origin nodes of the network of interconnected nodes.

More specifically, the system is operable to return a path from a destination node of the network of interconnected nodes to the origin node by back tracking from said destination node to said origin node, wherein, for each node in the path, the system is operable to identify a first received input to said each node from a neighboring node of said network of interconnected nodes.

Even more specifically, the path is a sequence of nodes ordered from the destination node to the origin node.

Another aspect of the disclosed teachings is a graph processing unit for enabling path finding and terrain analysis the unit comprising a network of interconnected nodes, each of the nodes having at least one digitally programmable delay unit, wherein each node further includes a plurality of input latches, each of the input latches being coupled to a respective input signal. A plurality of comparators is provided with each of the comparators coupled to a respective output signal. A transition detector operable to detect a transition in at least one of the outputs of said plurality of input latches, and further operable to assert a transition indication signal is provided. A storage unit operable to store a plurality of edge weights, each of the edge weights corresponding to a respective comparator from said plurality of comparators is provided. At least one counter is coupled to each of the plurality of comparators.

More specifically, at least one of the comparators is operable to generate an output signal when a value from the at least one counter is greater than an edge weight corresponding to the at least one comparator.

More specifically, the counter is operable to start counting when the transition indication signal is asserted.

More specifically, the plurality of latches are operable to latch corresponding values and further operable to cease accepting additional values from the input signals when the transition indication signal is asserted. More specifically, the storage unit is operable to be loaded with a plurality of edge weights corresponding to said plurality of comparators.

Even more specifically, the edge weights correspond to a terrain map.

In another specific enhancement, the system is integrated into a monolithic semiconductor device.

In yet another specific enhancement, the interconnection in the network of interconnected nodes includes connections between neighboring nodes and connections between non-neighboring nodes.

In yet another specific enhancement, the graphic processing unit is operable to allow for a delay controlled propagation of a signal from an origin node of the network of interconnected nodes to any one non-origin nodes of the network of interconnected nodes.

More specifically, the graphic processing unit is operable to return a path from a destination node of said network of interconnected nodes to the origin node by back tracking from said destination node to the origin node, wherein, for each node in the path, the graphic processing unit is operable to identify a first received input to said each node from a neighboring node of the network of interconnected nodes.

Even more specifically, the path is a sequence of nodes ordered from the destination node to the origin node.

Even more specifically, the graph processing unit is integrated into a monolithic semiconductor device.

Yet another aspect of the disclosed teachings is a node of a graph processing unit enabling path finding and terrain analysis. The node comprises a plurality of input latches, each of the input latches being coupled to a respective input signal. A plurality of comparators, each of the comparators coupled to a respective output signal are provided. A transition detector operable to detect a transition in at least one of the outputs of the plurality of input latches, and further operable to assert a transition indication signal. A storage unit operable to store a plurality of edge weights, each of the edge weights corresponding to a respective comparator from said plurality of comparators is provided. At least one counter is coupled to each of the plurality of comparators.

More specifically, at least one of the comparators is operable to generate an output signal when a value from the at least one counter is greater than an edge weight corresponding to the at least one comparator.

More specifically, the counter is operable to start counting when the transition indication signal is asserted.

More specifically, the plurality of latches are operable to latch corresponding values and further operable to cease accepting additional values from the input signals when the transition indication signal is asserted. More specifically, the storage unit is operable to be loaded with a plurality of edge weights corresponding to said plurality of comparators.

Even more specifically, the edge weights correspond to a terrain map.

In another specific enhancement, the node is integrated into a monolithic semiconductor device.

In yet another specific enhancement, the node is operable to be connected in a network of interconnected nodes includes connections between neighboring nodes and connections between non-neighboring nodes.

In yet another specific enhancement, the node is operable to identify the input that first received a signal from a neighboring node.

Yet another aspect of the disclosed teachings is a method for operating a system for path finding and terrain analysis, the method comprises receiving a query. A network of nodes of a propagation unit are initialized in accordance with parameters of the query. The propagation unit and the test counter are reset. Propagation of the propagation unit is enabled. Propagation is disabled upon completion of required propagation steps. Finally the results are read.

More specifically, upon said enabling of propagation, the following is performed for each node of the network. a) resetting a node counter; b) receiving inputs from at least one other node from said network of nodes; c) identifying if a change in at least one of said inputs has occurred and, if so, continuing with d) or, otherwise, continuing b); d) latching input values; e) advancing said counter by a predefined value;

f) for each node, comparing a value of the counter with an edge weight value corresponding to a corresponding edge of said each node and if the counter value is greater than the edge weight value than asserting a corresponding output; g) returning to e) if not all the outputs were asserted, or otherwise, exiting.

More specifically, a corresponding output is asserted if the counter value is equal to the edge weight value.

Yet another aspect of the disclosed teachings is a method for operating a system for finding a path from a destination node of a plurality of networked nodes to an origin node of the plurality of networked nodes, the method comprises a) making the destination node a current node b) repeating the following inner sequence for the current node: b1) identifying a first received input from a neighbor node to the current node; b2) checking if the neighbor node is said origin node and if so continuing with c); b3) adding the current node to a path of nodes; b4) making the neighbor node the current node; c) returning the path of nodes.

Still another aspect of the disclosed teachings is a method for operating a system for terrain analysis, the method comprises receiving a main query. A plurality of algorithm specific queries for pathfinding are generated from the main query. A propagation unit is reset. For each query of said plurality of algorithm specific queries the following are generated. a) initializing a network of nodes of the propagation unit in accordance with parameters of said each query of said plurality of algorithm specific queries; b) resetting a test counter; c) enabling propagation of the propagation unit; and, d) disabling propagation upon completion of required propagation steps; and, e) providing a result corresponding to said main query.

III. BRIEF DESCRIPTION OF THE DRAWINGS

For better understanding of the disclosed teachings and to show how the same may be carried into effect, reference will now be made, purely by way of example, to the accompanying drawings. The particulars shown in the figures are by way of example and for purposes of illustrative discussion of the teachings, and are presented in the cause of providing what is believed to be most useful and readily understood description of the principles and conceptual aspects of the teachings. In this regard, no attempt is made to show structural details in more detail than is necessary for a fundamental understanding of the teaching, the description taken with the drawings making apparent to those skilled in the art how the teaching maybe embodied in practice. In the accompanying drawings:

FIG. 1—is a high-level block diagram of the disclosed teachings.

Figure 2:
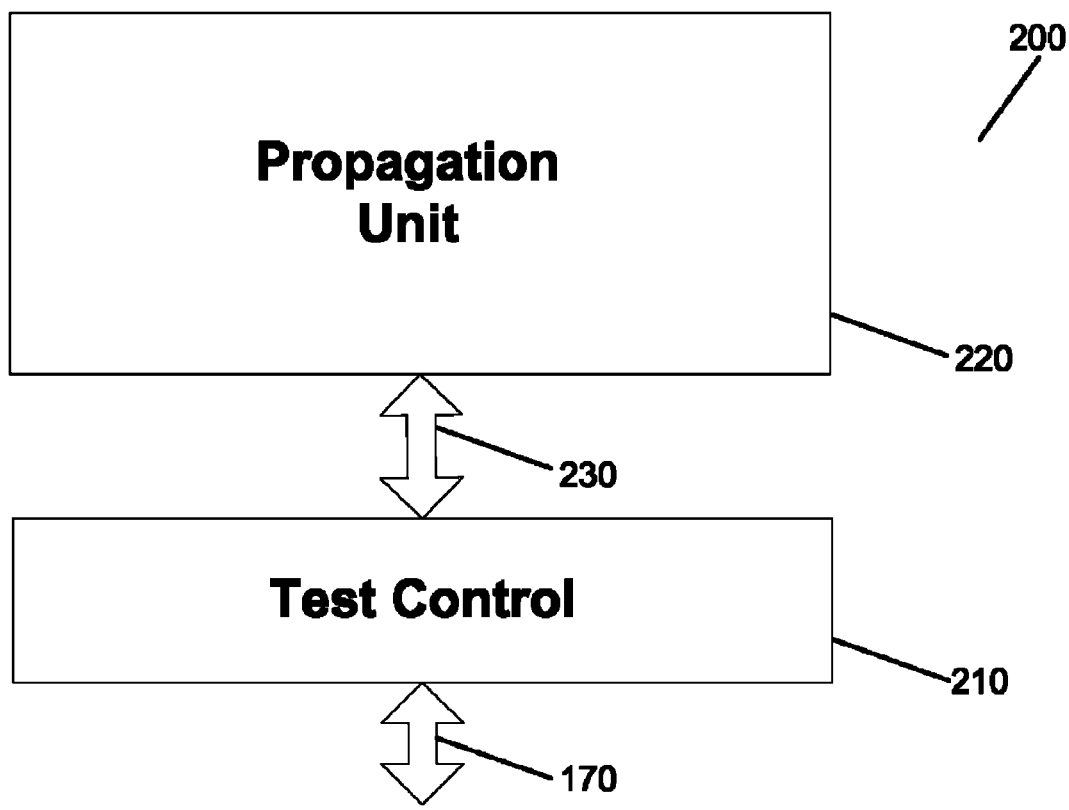

FIG. 2—is a top-level architecture of the graph-processing unit.

Figure 3:
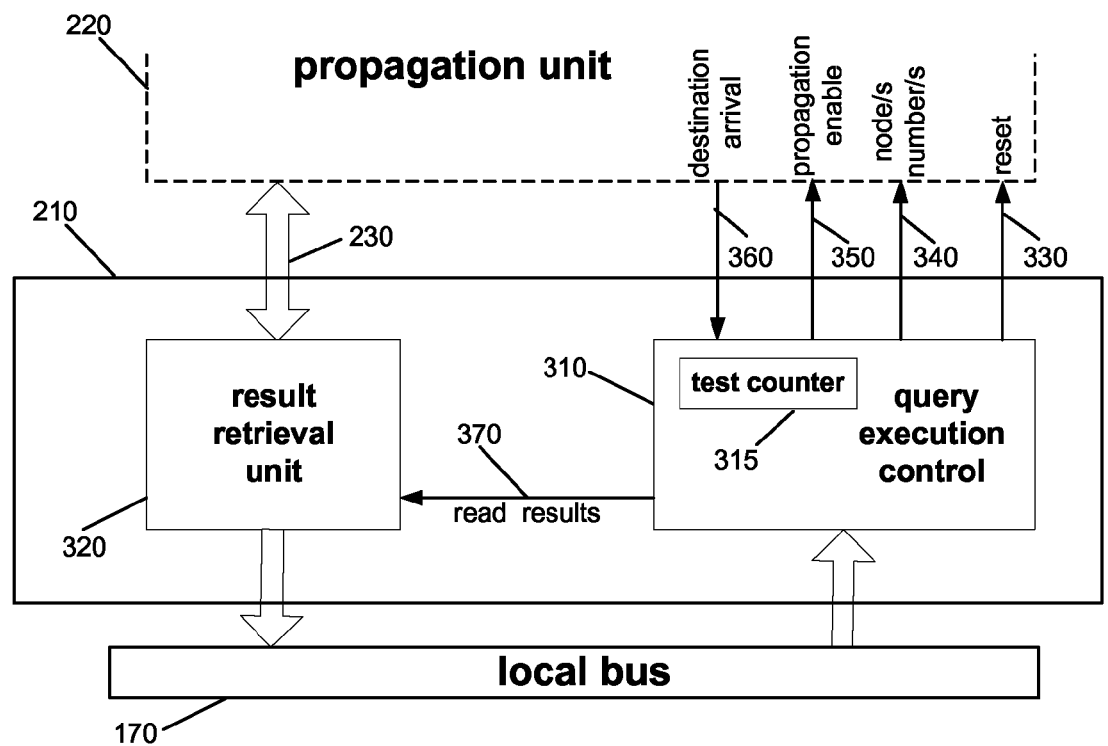

FIG. 3—is an architecture of the control unit.

Figure 4:
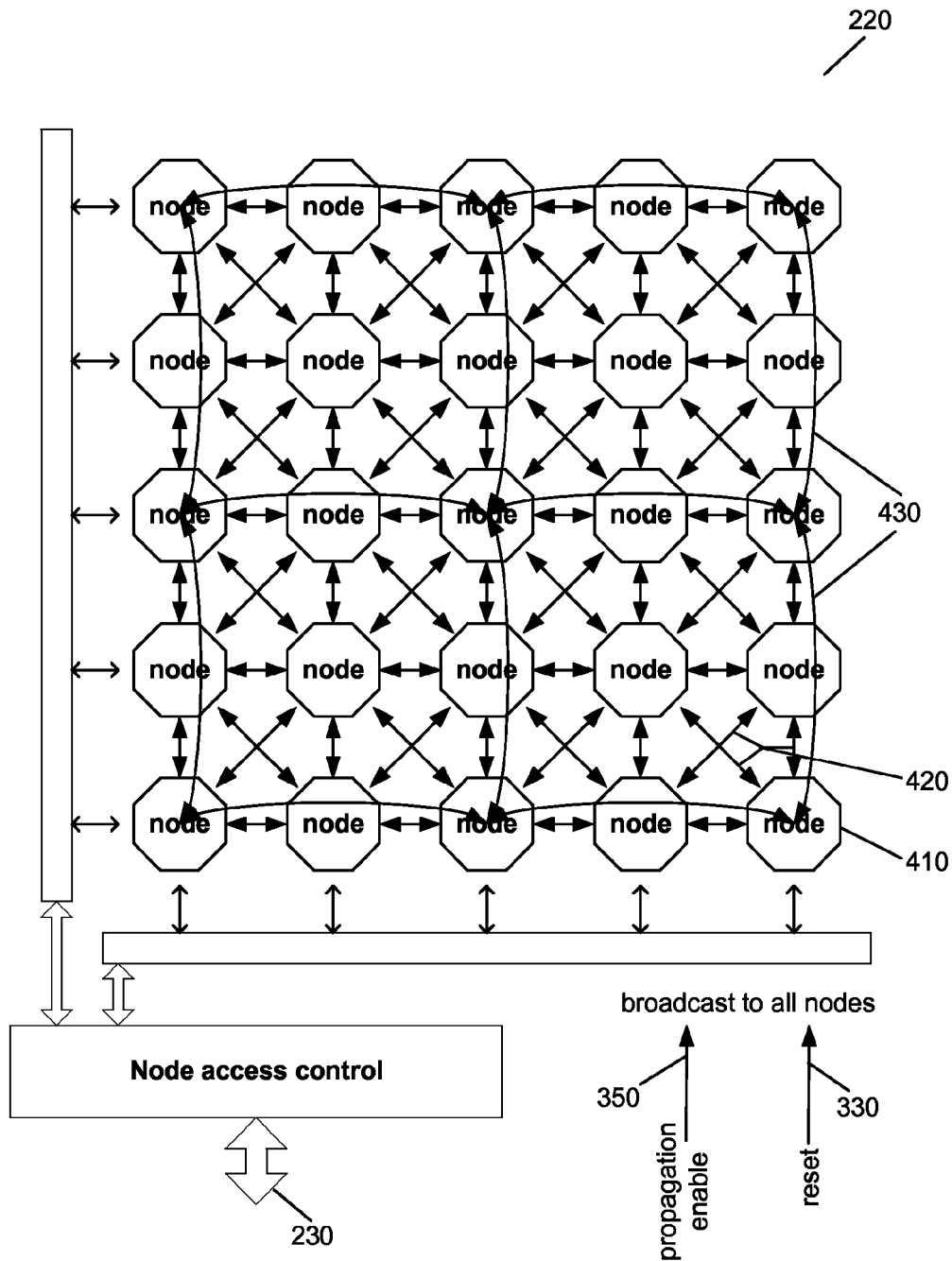

FIG. 4—is an architecture of propagation unit.

Figure 5:
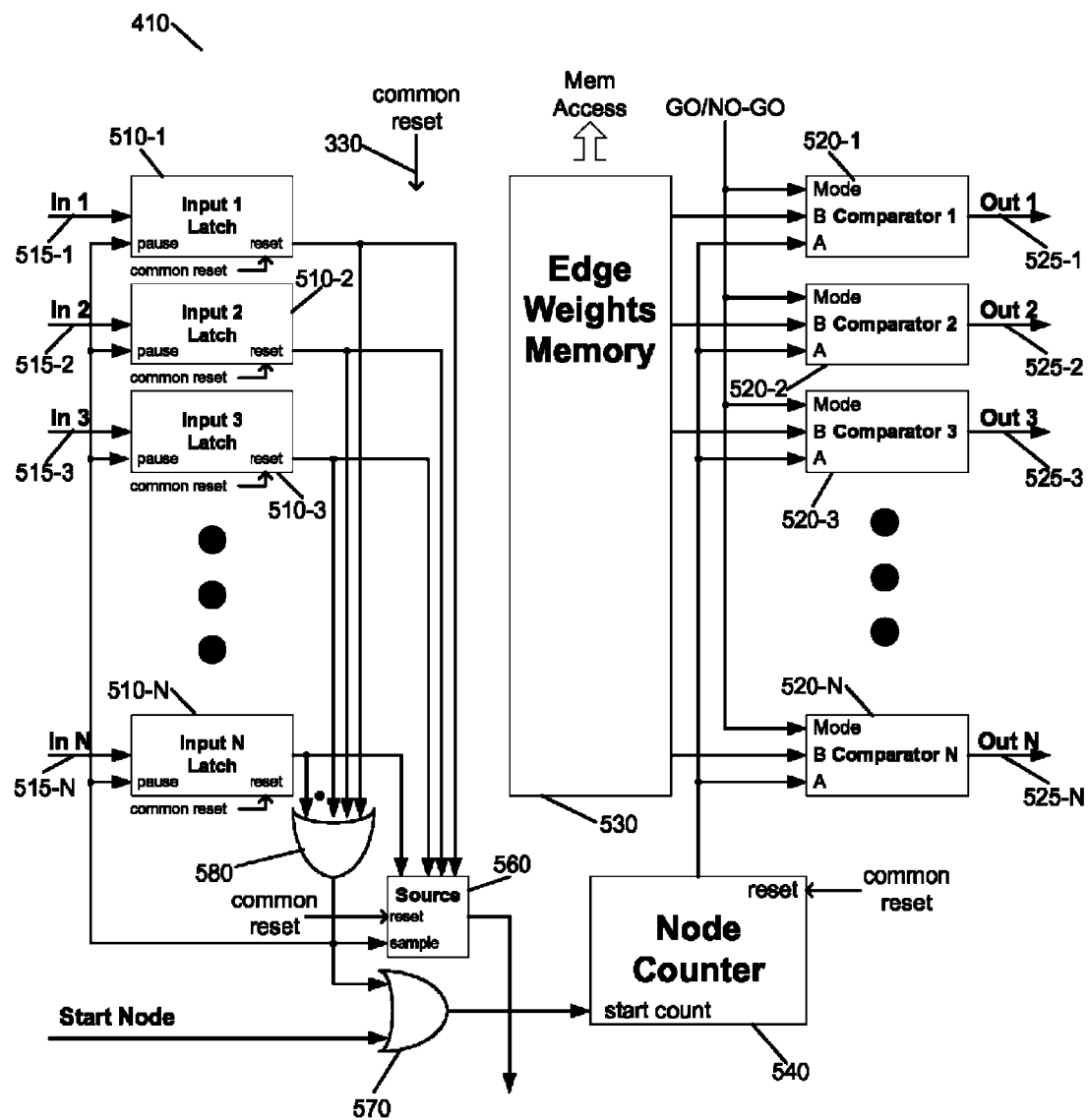

FIG. 5—is a node architecture of the graph-processing unit.

Figure 6:
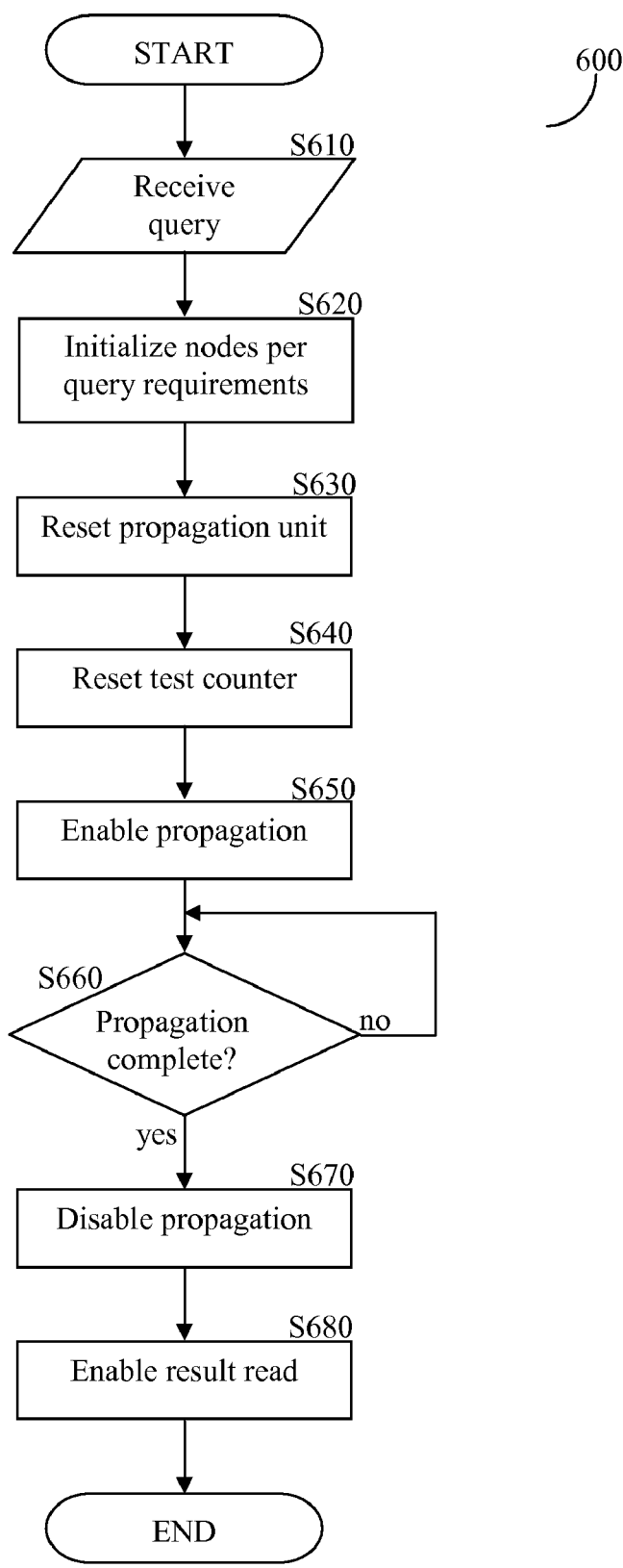

FIG. 6—is a flowchart describing the steps of the operation of the control unit in accordance with the disclosed teachings.

Figure 7:
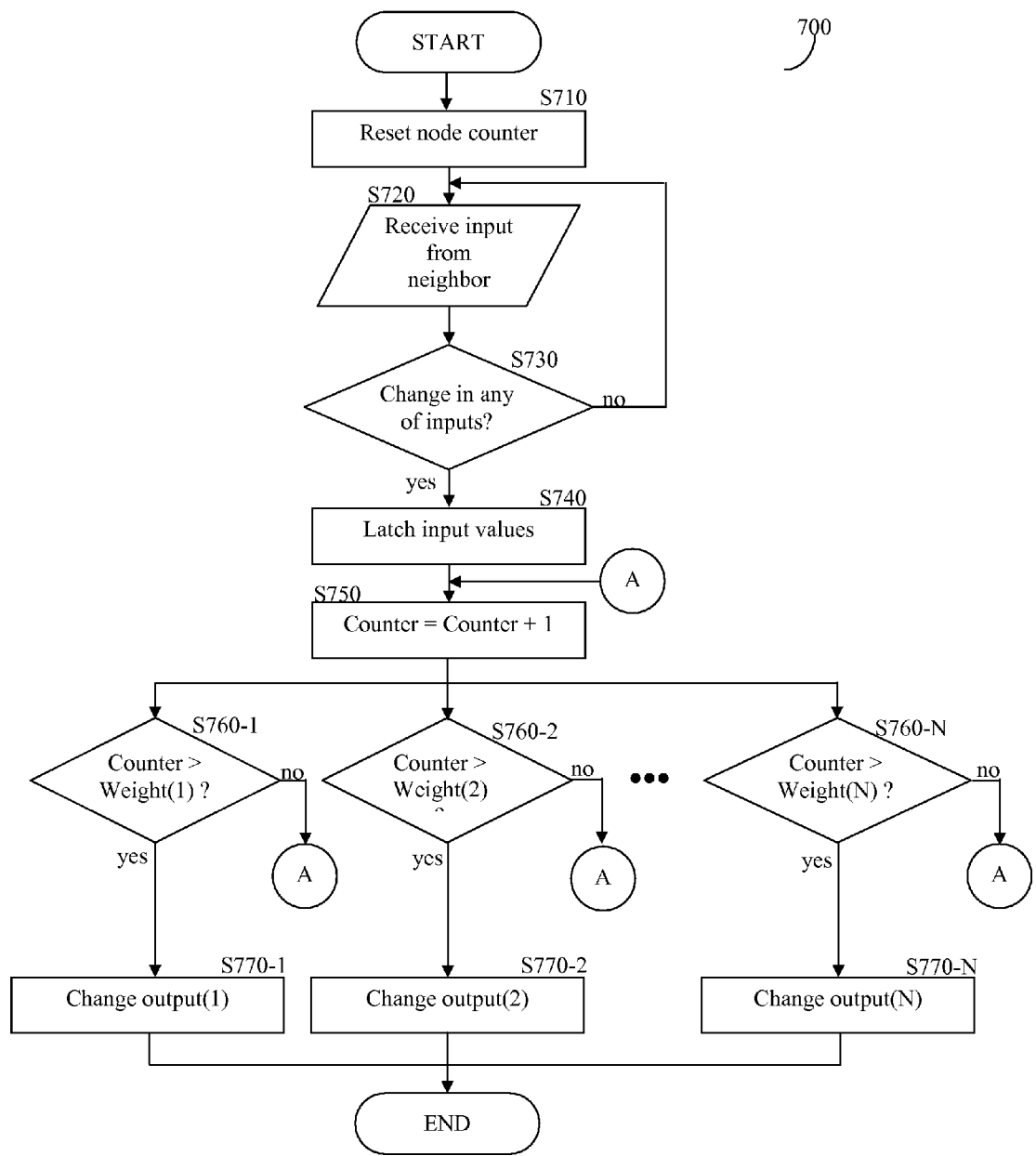

FIG. 7—is a flowchart describing the steps of the operation of a node in accordance with the disclosed teachings.

Figure 8:
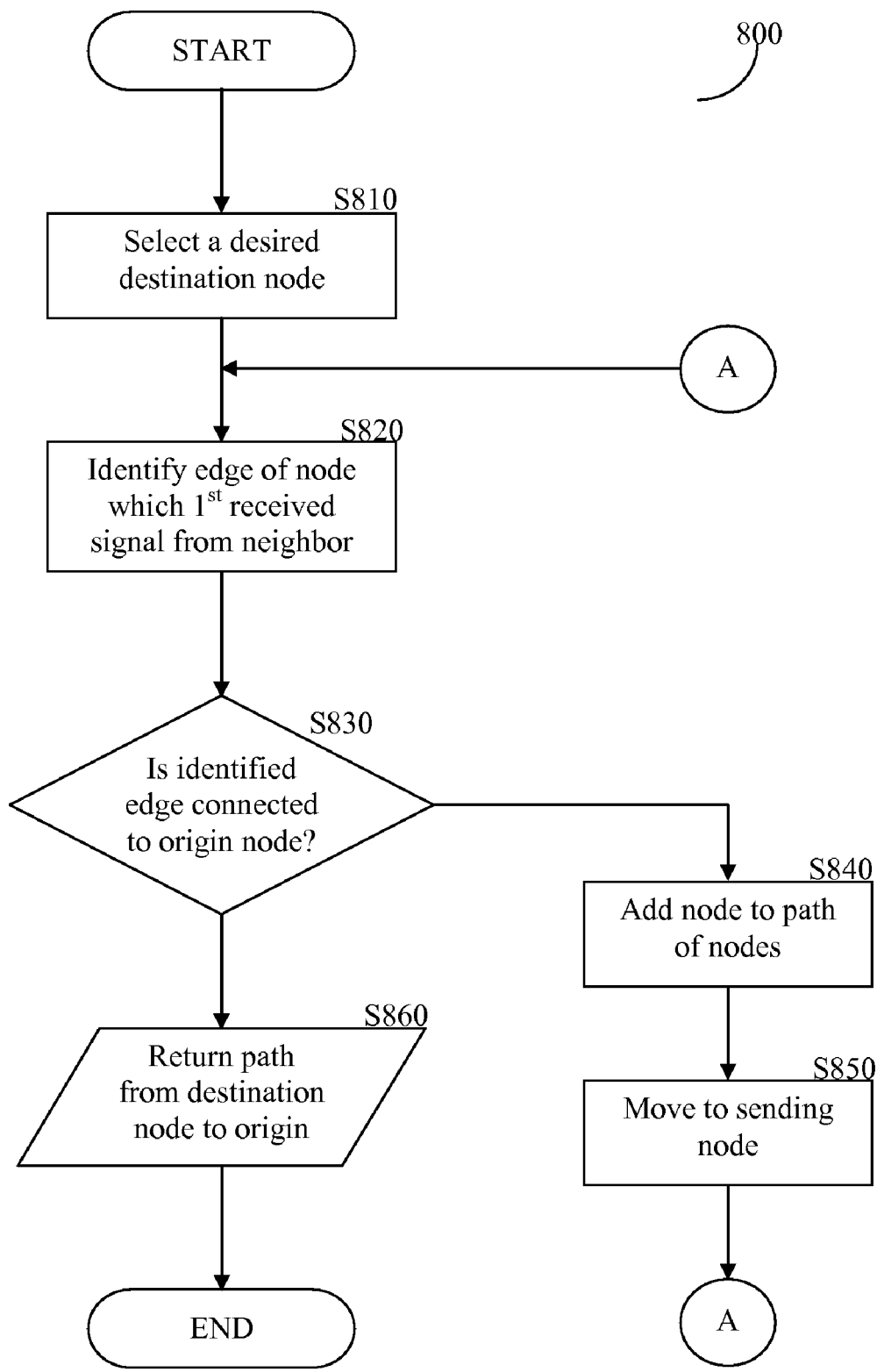

FIG. 8—is a flowchart describing the steps of extracting a path from a destination node to an origin node in accordance with the disclosed teachings.

IV. DETAILED DESCRIPTION

An exemplary system dedicated for such artificial intelligence (AI) tasks is described herein. This system could be embodied in a semiconductor chip. The system contains some or all of the followings: processors, configurable program memory, data memory, bus interface, dedicated logic for processing AI techniques, and a graph-processing unit.

The graph-processing unit holds a network of interconnected node, each of which comprises at least one digitally programmable delay. The network represents the weighted graph, where the delays act as the edges. The delay is formed by a single counter in each node, a dedicated memory, also referred to as edges memory, and a comparator element on each edge between nodes. The edge is triggered once the memory is equal to the counter. This physical realization of a weighted graph is then used for searching minimal paths in a reduced time by injecting an electromagnetic pulse at the start node and letting it propagate through the entire network in parallel in accordance with the predetermined delays. Resetting all these counters allows the performing of a new test without the need to reload the graph representation.

The disclosed teaching is further aimed at allowing access to the system in one or more of the following manners: configuring the graph processing unit with one or more terrain representations (raster maps, navmesh, etc.), search-path queries, and terrain analysis queries. The results are stored and accessible to the computer program. The graph-processing unit is supplemented with an embedded processor and dedicated logic for performing post-processing of the path-searching and terrain analysis queries. Accordingly the graph processing unit may be used iteratively to process the results with the aid of additional data memory.

In an embodiment of the disclosed teaching the embedded processor/s are used to manage and run the queries in batch mode. Each query in the batch is decoded, executed and answers stored in memory, the answers can be retrieved together or separately, as may be necessary. The processor can also change the order of queries in the batch for optimization. For example, it is possible to gather all queries for the same map, and units of the same size, into a single query.

The disclosed teaching further allows for the finding of the T-connected region connectivity in a highly efficient manner, by allowing the embedded processor to halt the propagation in the propagation unit inside the graph-processing unit after time T, and retrieve the nodes that the signal arrived at.

An exemplary implementation of a system with an architecture embodying the disclosed teaching is presented herein. Such a system contains processor/s, graph-processing unit, AI dedicated logic and peripherals (memory, interfaces, etc.). It is to be understood that the invention is not limited in its application to the details of construction and the arrangement of the components set forth in the following description or illustrations in the drawings.

Reference is now made to FIG. 1 that is an exemplary and non-limiting description of a preferred high-level block diagram of such a system 100. In this implementation, access to system 100 is performed via bus interface unit 160. Graph-processing unit 120 may be accessed directly, for example, by a computer program via the bus interface. Alternatively program memory 130 is uploaded with a batch of AI queries and other directives that are processed by one or more of plurality of processors 110 using embedded processing programs. Data memory 140 is used for aiding processors 110 while executing the program and for storing results of different queries. Graph-processing unit 120 is connected via local bus 170 to bus interface unit 160 and processors 110. Graph-processing unit 120 accepts requests for loading a map, searching a path, retrieving a node status and more. These are further explained in conjunction with FIG. 2 below. The AI dedicated logic 150 is similarly connected to local bus 170 and performs preprocessing and post-processing of the AI queries, for example path-smoothing or string-pooling queries. The specific protocol used to connect bus interface unit 160 with its respective user may vary and should not be considered as limiting the scope of the disclosed teaching. In referring to FIG. 2, there is described an exemplary and non-limiting top-level architecture of the graph-processing unit 120. Graph-processing unit 120 comprises of at least two building blocks: control unit 210 and propagation unit 220. Control unit 210 is responsible for accepting requests, for example from processors 110, AI dedicated logic 150, or through bus interface unit 160, driving propagation unit 22, and extracting the results. Control unit 210 is explained in further detail in conjunction with FIG. 3 below. Propagation unit 220 is a grid of nodes that are preferably connected as further described in FIG. 4, or in any other architecture, and further capable of storing a graph representation.

With reference to FIG. 3 there is described an exemplary and non-limiting architecture of control unit 210 of graph-processing unit 12. Query execution control 310 receives commands from local bus 170 to run a single query. Query execution control 310 then generates reset, through reset signal 330, in order to clear the state of propagation unit 220, drives propagation unit 220 with the node numbers 340 from which the signal should start propagating, resets and starts test-counter 315, and enables the signal propagation in propagation unit 220 by asserting propagation enable signal 350.

Execution ends when either test-counter 315 reaches a predefined time T in time limited queries, or, when the propagating signal in propagation unit 22 reaches a destination node indicated by destination arrival signal 360. At that point, query execution control 310 disables signal propagation of propagation unit 220 by stopping to assert propagation enable signal 350. Query execution control 310 then activates read result signal 370 to result retrieve unit 320, thereby indicating the ability to start reading the results from the propagation unit 220. The procedure is described in more detail in conjunction with FIG. 6 below.

Reference is now made to FIG. 4 where an exemplary and non-limiting diagram of an architecture of propagation unit 220 of graph-processing unit 120 is shown. Propagation unit 220 comprises of a plurality of nodes 410 forming an array of rows and columns of nodes 410. Adjacent nodes are connected via regular edges 420, and some of the nodes are connected via leaping edges 430. Each edge is attributed with a programmable private cost that determines the time it will take a signal to propagate throw it during a test. An exemplary architecture enables the processing of standard Real-Time-Strategy (RTS) maps. The presence of leaping edges 430 is essential for embedding general 3D scenes which use navmesh or waypoint graph. Before running a batch of queries, propagation unit 220 is configured with the representation of a map, i.e., edge costs', which are stored inside the plurality of nodes 410.

Each path-finding query begins by first resetting the state of all the nodes 410 by asserting signal 330, followed by selecting the nodes from which the signal will start to propagate. Thereafter propagation is enabled by asserting propagation enable signal 350. Each node 410 contains a counter that represents the time passed since the node was first reached, and holds information about the neighbor node from which the signal first arrived. This allows, once test execution is complete, the back tracing of the shortest-path to every node from the origins of propagation. Multiple tests of the same terrain representation can be achieved consuming minimal time by simply repeating the test flow once for each new test. The architecture and behavior of a node 410 is described in more detail in conjunction with FIG. 5 below. In an alternate implementation, access to propagation unit 220 is as a memory. This is true for weights' configuration (map uploading and updating), test activation, and results retrieval.

With reference to FIG. 5 there is describes an exemplary and non-limiting node 410 architecture of propagation unit 220. Node 410 is parameterized with the number of inputs 515 and number of outputs 525 that it can be connected by. During a test, each input 515 is latched using input latches 510 for as long as none of the inputs has changed. Once a propagating signal arrives at any one of the inputs 515, for example input signal 515-1, an arrival signal is generated by OR gate 580 causing latches 510 to stop any further input signal 515 latching. The arrival signal also causes the sampling of the latches' state by latch 560. This allows post-test retrieval of the source, i.e. a neighbor node, from which the signal propagated to the sampling node and allow the backtrace of the path to every node from the propagation origins.

Once the arrival signal changes, node counter 540 starts counting, and comparators 520 start comparing the value of node counter 540 with the configured weight of each edge stored in edge weights memory 530. Each comparator 520, for example comparator 530-1, changes its respective output 525, for example 525-1, it controls when the value of node counter 540 is equal or greater than the configured weight in edge weights memory 530. As a result, the propagating signal arriving from one of the neighboring nodes, continue its propagation only after the appropriate assigned delay time has passed since its arrival at the specific node.

For accelerated connectivity test, comparators 520 contain a mode input that allows them to change outputs 525 immediately after node counter 540 starts counting. In one implementation of the disclosed teaching this takes place only if the specific edge weight configuration is not set to disconnect mode. For enabling a node to become a propagation origin node, the "start count" signal activating node counter 540 is generated as a combination of the arrival signal as output from OR gate 560 and the "start node" input, both being inputs to OR gate 570. Before each test, control unit 210 resets the node by asserting common reset 330 for all nodes 410. As a result all nodes 410 are cleared from the results of the immediately previous test. The procedure is described in more detail in conjunction with FIG. 7 below.

Reference is now made to FIG. 6 where an exemplary and non-limiting flowchart 600 describing the steps of the operation of control unit 210. In S610 a query is received. In S620 the nodes 410 are initialized by loading their respective edge weights memory 530 with the appropriate edge weight values. S630 may be skipped in the case where the same map is to be used for another calculation sequence. In S630 propagation unit 220 is reset to clear it from all residue results of any previously made tests. It should be noted that the initialization loading that took place in S620 is not reset by this process in S630. In S640 test counter 315 is reset and in S650 the propagation sequence is enabled. The details of the operation during the propagation sequence are shown in FIG. 7 below. In S660 it is checked whether propagation sequence has ended and if so execution continues with S670; otherwise, execution continues with S660. In S670 propagation sequencing is disabled and in S680 results are read.

Reference is now made to FIG. 7 where an exemplary and non-limiting flowchart 700 describing an implementation of the operation of a node 410 is presented. In S710, the node counter of a node 410, for example node 410-1, is reset to an initial value, for example, zero. In S720 node 410 receives inputs from a plurality of neighbor nodes. In S730 it is checked if there was any change from a previous state of the incoming signals to the node and if so execution continues with S740; otherwise, execution continues with S720. In S740, the values of the plurality of inputs are latched in input latches 510. In S750, the node counter is incremented.

S760 comprises a plurality of steps S760-i, where i=1 through N, where N is the number of outputs to neighboring nodes of the node 410. In each of the plurality of steps S760 the value of the counter is checked against the respective value in edge weights memory 530 of the respective node 410. If the counter value is equal or greater than the respective weight value than execution continues with a respective step S770-i of a plurality of S770 steps; otherwise, execution continues with step S750. In each of the plurality of steps S770 the respective output 525-i (see FIG. 5) is changed, thereby allowing the beginning of the influence of the propagation on a neighboring node.

Referring to FIG. 8 there is shown an exemplary and non-limiting flowchart 800 describing the steps of finding a path from a destination node to an origin node in accordance with the disclosed teaching. In S810 a destination node is selected. The destination node is one of the plurality of nodes 410 of propagation unit 220. In S820 the edge that first received a signal from a neighboring node for a current node 410 is identified. This process is explained in more detail above. In S830 it is checked whether that neighboring node is the origin node of the plurality nodes 410, and if so execution continues with S860; otherwise, execution continues with S840. In S840 the current node is added to a path of nodes. In S850 that neighboring node is selected and the process of path identification continues with S820. In S860 the path from the destination node to the origin node is returned.

In an exemplary implementation of the disclosed teachings system 100, graph processing unit 120, propagation unit 220, or a node 410, may be configured to operate under the control of a main query. From the main query for terrain analysis a plurality of algorithm specific pathfinding queries are generated. The algorithms may be, but is not limited to, selecting an origin and a target at random in a certain area. Once at least a first pathfinding query is available propagation unit 220 may be rest. This reset takes place once per run of the plurality of queries because the terrain map remains the same. However, it is possible to change some of the weights in each query being executed as may be necessary. For each of the queries nodes 410 are initialized, if necessary, the test counter is reset and propagation unit 220 is enabled to begin its operation. Once the propagation for a query is complete propagation unit 220 is disabled and the results are accumulated. The sequence repeats for each of the queries generated. At the end of the process the plurality of results from all the queries may be processed, for example on one of plurality of processors 110, and thereafter a final result is provided.

A person skilled in the art would appreciate that the disclosed teaching has benefits over related art for computer games AI. However, these improvements can be further used in other areas for multiple purposes and applications. This includes, but is not limited to: a) faster execution by loading of the graph into a specially arranged memory inside graph processing unit 120 in order to allow multiple propagation queries without the need to reload graph; b) smaller implementation size by having counters in each node and only memory and comparators on each edge, instead of counters on the edges; c) retrieval of the path-cost to each node by having a global counter in graph processing unit 120 and subtracting the specific node's counter from the global counter; and, d) "GO/NO GO" mode for fast connectivity test that allows propagation of a signal through a node in a single clock for any connected edge, where a connected edge is an edge with a weight different than the weight defined as disconnection. A person skilled-in-the-art would further appreciate that the disclosed teaching can be used in a tiered approach using graphs and maps with different levels of detail allowing the solving of very large graphs efficiently.

The claims alone represent the metes and bounds of the invention. The discussed implementations, embodiments and advantages are merely exemplary and are not to be construed as limiting the present invention. The detailed description of the implementations is intended to be illustrative, and is not intended to limit the scope of the claims. Many alternatives, modifications, and variations will be apparent to those skilled in the art.

What is claimed is:

1. A method for operating a computer system for terrain analysis, the computer system including at least a processor and a storage the method comprising:
   receiving a query from a user for performing a task on the computer system;
   initializing the system with parameters of said query and initializing a network of nodes;
   enabling propagation of data responsive of the query within the system by performing following steps:
   a) resetting a node counter of said network of nodes;
   b) receiving inputs from at least one other node of said network of computer nodes;
   c) identifying if a change in at least one of said inputs has occurred and, if so, continuing with d) or, otherwise, continuing b);
   d) latching input values;
   e) advancing said counter by a predefined value;
   f) for each node, comparing a value of the counter with an edge weight value corresponding to a corresponding edge of said each computer node and if the counter value is greater than the edge weight value than asserting a corresponding output;
   g) returning to e) if not all the outputs were asserted, or otherwise, exiting;
   and,
   providing results.

2. The method of claim 1, further comprising:
   resetting a propagation unit of the system.

3. The method of claim 2, further comprising:
   Enabling propagation of the propagation unit.

4. The method of claim 3, further comprising:
   disabling propagation upon completion of required propagation steps.

5. The method of claim 1, further comprising:
   resetting a test counter of the system.

6. The method of claim 1, wherein said providing results comprising providing of at least one of: the path finding, the terrain analysis, path cost, and fast connectivity test.

7. The method of claim 1, wherein a corresponding output is asserted if the counter value is equal to the edge weight value.

8. A method for operating a computer system, the computer system including a processor and a storage the method comprising:
   receiving a main query;
   initializing processing elements of an array of processing elements with corresponding graph node data;
   marking at least one node as a propagation origin;
   marking at least one node as a propagation target;
   resetting a propagation counter;
   enabling propagation through the array of processing elements, wherein each processing element processing the node data it was assigned; and stopping the simulation upon one of: a destination node is reached, or the propagation counter reaches a predetermined value.

9. A method for operating a computer system for terrain analysis the system having a processor and a storage, the method comprising:
receiving a main query;
generating from said main query a plurality of algorithm specific queries for pathfinding;
resetting a propagation unit;
enabling for each query of said plurality of algorithm specific queries the following:
initializing a network of nodes of the propagation unit in accordance with parameters of said each query of said plurality of algorithm specific queries;
resetting a test counter;
enabling propagation of the propagation unit; and,
disabling propagation upon completion of required propagation steps; and,
providing a result corresponding to said main query;
such that terrain analysis is performed based on the main query.

* * * * *